United States Patent [19]
McNeil et al.

[11] Patent Number: 6,094,806
[45] Date of Patent: Aug. 1, 2000

[54] METHOD FOR FABRICATING A DUAL ELEMENT HEAD

[75] Inventors: Michael McNeil, Nederland; Harlan Mathews, Boulder, both of Colo.

[73] Assignee: Maxtor Corporation, Longmont, Colo.

[21] Appl. No.: 09/236,875

[22] Filed: Jan. 26, 1999

Related U.S. Application Data

[62] Division of application No. 08/955,197, Oct. 21, 1997, Pat. No. 5,940,250.

[51] Int. Cl.$^7$ ............................................. G11B 5/42
[52] U.S. Cl. ................................. 29/603.14; 29/603.15
[58] Field of Search .......................... 29/603.14, 603.15; 360/104, 105, 113, 121, 122

[56] References Cited

U.S. PATENT DOCUMENTS

| | | | |
|---|---|---|---|
| 4,367,505 | 1/1983 | Stromsta et al. | 360/118 X |
| 4,386,383 | 5/1983 | Desserre et al. | 360/122 X |
| 4,613,920 | 9/1986 | Higuchi et al. | 360/121 |
| 4,691,260 | 9/1987 | Hosaka et al. | 360/118 X |
| 4,992,901 | 2/1991 | Keel et al. | 360/110 |
| 5,229,901 | 7/1993 | Mallary | 360/104 |
| 5,438,747 | 8/1995 | Krounbi et al. | 29/603 |

OTHER PUBLICATIONS

"Disk Drive Technology" distributed by KnowledgeTek at training seminar in Longmont, Colorado, Dec. 14–16, 1998, p. 5–19.

*Primary Examiner*—Carl E. Hall
*Attorney, Agent, or Firm*—David M. Sigmond

[57] ABSTRACT

A method for fabricating a dual element head is disclosed. One embodiment includes first depositing a first head element upon a substrate and second depositing a second head element upon the first head element. Each of the depositing steps includes a tolerance that is independent of the other. In the second depositing step, the functional width of the second head element (i.e., the write width if the second head element is a write element) is made wider than a desired functional width for the second head element. The second head element is then trimmed to substantially achieve the desired functional width while using a portion of the first head element as a reference to reduce errors associated with the independent nature of the first and second tolerances. For instance, the portion of the first head element used as a reference can be an edge of a magnetoresistive (MR) read element that defines the read width of the read element. Preferably, the trimming step includes creating erase notches on a portion of the write element that are capable of erasing data from a recording medium. Thereafter, second notches that are deeper than the erase notches and hence less capable of erasing data than the erase notches are created next to the erase notches to adjust the width of the erase notches. It is also preferred that the first head element and the second head element include an air bearing surface that resides substantially in the x-z plane, and that the second head element is trimmed by a focussed ion beam from a direction that includes a y-component to adjust the width of the second head element in the z-direction.

50 Claims, 15 Drawing Sheets

METHOD FOR FABRICATING A DUAL ELEMENT HEAD

CROSS REFERENCE TO RELATED APPLICATIONS

This application is a divisional of U.S. application Ser. No. 08/955,197, filed Oct. 21, 1997, now U.S. Pat. No. 5,940,250.

FIELD OF THE INVENTION

The invention relates in general to heads used in digital data storage systems for transferring digital information from/to a storage medium and, more particularly, to dual element heads having both a write element and a read element.

BACKGROUND OF THE INVENTION

A magnetic disk drive is a digital data storage device that stores digital data on a magnetic medium known as a disk. The disk, in general, comprises a plurality of concentric tracks for storing the digital data. Data is stored on the tracks of the disk in the form of magnetic polarity transitions induced into a magnetic layer covering the disk. During operation of the disk drive, the disk is rotated about an axis by a spin motor at a substantially constant angular speed. To perform a transfer of data with the disk, a transducer, known as a head, is centered above a track of the rotating disk. Once centered, the head can be used to transfer data to the predetermined track (during a write operation) or to transfer data from the track (during a read operation). During a write operation, for example, a write current is delivered to the centered head to create an alternating magnetic field in a lower portion of the head that induces magnetic polarity transitions onto the track. During a read operation, the centered head senses magnetic fields emanating from the magnetic polarity transitions on the moving track to create an analog read signal representative of the data thereon.

In some disk drive systems, a head with a single element is used to perform both read and write operations. That is, the same element that induces the polarity transitions into the track during a write operation, senses the polarity transitions during a read operation. Other disk drive systems use dual element heads that include both a write element and a separate read element. Dual element heads are advantageous because they allow each element to be optimized for performing a single unique function (i.e., reading or writing). Dual element heads of the past, however, are known to produce a nonlinear servo position signal transfer function that can significantly degrade servo performance.

FIG. 1A illustrates an ideal servo position signal transfer function 10 for a dual element head having a magnetoresistive (MR) read element. Note the linearity of the ideal transfer function. FIG. 1B, on the other hand, illustrates an actual servo position transfer function 12 that can be expected in practice. As illustrated, this servo position transfer function is nonlinear in the region 14 between the track centerlines. This nonlinearity is undesirable because it can result in, for example, increased tracking error, longer seek settling times, increased data channel error rate, and decreased reliability.

Therefore, a need exists for a dual element head that avoids some of the problems associated with dual element heads of the past.

SUMMARY OF THE INVENTION

The present invention relates to a dual element head, and a method for fabricating the same, that overcomes some of the problems of past dual element heads. To accomplish this, the head utilizes a read element having a read width that is wider than the write width of a corresponding write element. In conceiving of the present invention, it was appreciated that nonlinearities in the servo position signal transfer function are attributable, in large part, to heads having read widths that are narrower than corresponding write widths. This "write wide/read narrow" approach is currently the standard used in the industry for dual element heads. The industry adopted the standard based, in part, upon concerns associated with coherent adjacent track noise and coherent noise created by old data written on the track. That is, it is generally believed that the read element must be narrower than the write element to avoid the sensing of undesired data (i.e., coherent noise) from the disk during a read operation. In conceiving of the present invention, it was determined that a read wide/write narrow head could be implemented without incurring the problems associated with the reading of undesired data from the disk by creating an erase strip having an optimized width around the written data and by carefully selecting the head dimensions. The erase strip removes undesired data from a track of the disk, during a write operation, that could otherwise be read by the wider read element during a subsequent read operation involving the track.

In one aspect of the present invention, a head is provided for use in transferring data between a track on a recording medium, such as a magnetic disk or tape, and an exterior environment. The head includes a write element having a write width and a read element having a read width that is greater than the write width. In a preferred embodiment, the read element is a magnetoresistive read element. Erase means can also be provided for creating an erase strip on at least one side of the written data to erase unwanted old data.

In another aspect of the present invention, a disk drive is provided. The disk drive includes a disk for storing data, a spin motor for rotating the disk, a head for use in transferring data between the disk and an exterior environment, and positioning means for locating the head over a track of the disk. The head includes a write element having a write width and a read element having a read width that is greater than the write width. The read element can be a magnetoresistive read element. In one embodiment, the write width of the write element is determined by the equation:

$$nomWW = TS - SQ - EB$$

where nomWW is the nominal write width, TS is the ideal track spacing of the disk, SQ is the allowed amount of adjacent track encroachment from the TMR budget, and EB is an erase band width. In addition, the head can include erasing means for creating an erase strip as described previously. In another embodiment, the read width of the read element is determined by the following equation:

$$nomRW = [2*(TS-SQ) - nomWW*(1+TW)]/(1+TR)$$

where nomRW is the nominal read width, TS is the ideal track spacing, Tw is the write width tolerance, and Tr is the read width tolerance.

In another aspect of the present invention, a method for fabricating a dual element head having a read width greater than a write width is provided. The method comprises first depositing a first head element upon a substrate and second depositing a second head element upon the first head element. Each of the depositing steps includes a tolerance that is independent of the other. In the second depositing step, the functional width of the second head element (i.e., the write width if the second head element is a write element) is made wider than a desired functional width for the second head element. The method also includes trimming the second head element to substantially achieve the desired functional width while using a portion of the first head element as a reference to reduce errors associated with the independent nature of the first and second tolerances. In one embodiment, the first head element is a read element (e.g., a magnetoresistive read element) and the second head element is a write element. The portion of the first element used as a reference can include a portion, such as an edge of a magnetoresistive read element, that defines the read width of the read element.

The trimming step can include creating erase notches on a portion of the write element that are capable of erasing data from a medium. The inner bounds of the erase notches define the edges of the write width. Second notches that are deeper than the erase notches and hence less capable of erasing data than the erase notches can be created next to the erase notches to adjust the width of the erase notches. In this way, the erase notches can be made of equal width to one another and/or be optimized to perform read wide/write narrow functions. In one embodiment, the trimming step includes ion milling.

In yet another aspect of the present invention, a method for fabricating a dual element head is provided. The method includes providing a substrate having an upper surface that resides substantially in the y-z plane. A first plurality of layers are deposited on the substrate from approximately the x-direction to form a first head element. A second plurality of layers are then deposited upon the first plurality of layers to form a second head element. The first head element and the second head element include an air bearing surface that resides substantially in the x-z plane. The second head element is then trimmed by directing a focussed ion beam at a portion of the second head element from a direction that includes a y-component to adjust the width of the element in the z-direction. Trimming from a direction that includes a y-component allows the first head element to be used as a reference in the trimming process. In this way, overall tolerancing errors can be reduced.

DETAILED DESCRIPTION

The present invention relates to a dual element head that includes a read element and a separate write element, wherein the read width of the read element is greater than the write width of the write element. The head also includes erasing means for creating an erase strip along the edge of data written by the write element during a write operation. The width of the erase strip is optimized so that undesired data on the track, that could otherwise be read by the wider read element during a subsequent read operation, is removed during the write operation. A process for fabricating a dual element head having the above described properties is also provided. The dual element head of the present invention has application in virtually any type of magnetic recording system, such as magnetic disk drives or tape systems.

Before the invention is described, some of the properties of dual element heads that are relevant to the invention will be discussed.

During read and write operations in a disk drive, as described above, a head is maintained in a centered position above a desired track in a process known as track following. When using a dual element head, this process entails centering the write element during a write operation and centering the read element during a read operation. For various reasons, the write element of a dual element head is not always centered on a track when the corresponding read element is centered on the track, and vice versa. The reasons for this become apparent with reference to FIG. 2.

Figure 1A:
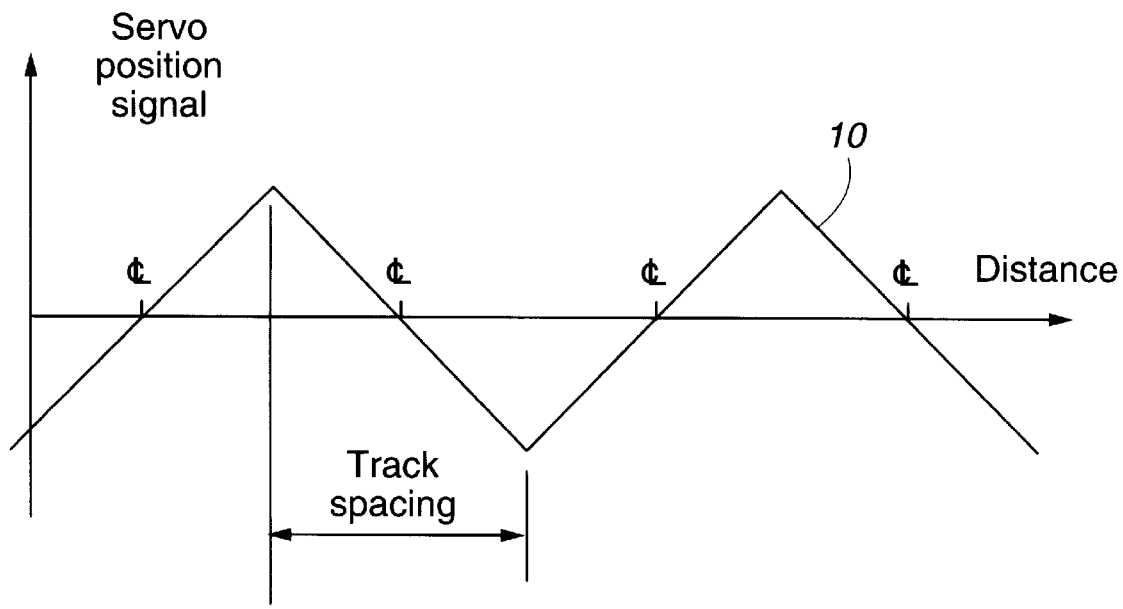
FIGS. 1A and 1B illustrate an ideal servo position signal transfer function and a nonlinear servo position signal transfer function for a magnetoresistive head.
Figure 1B:
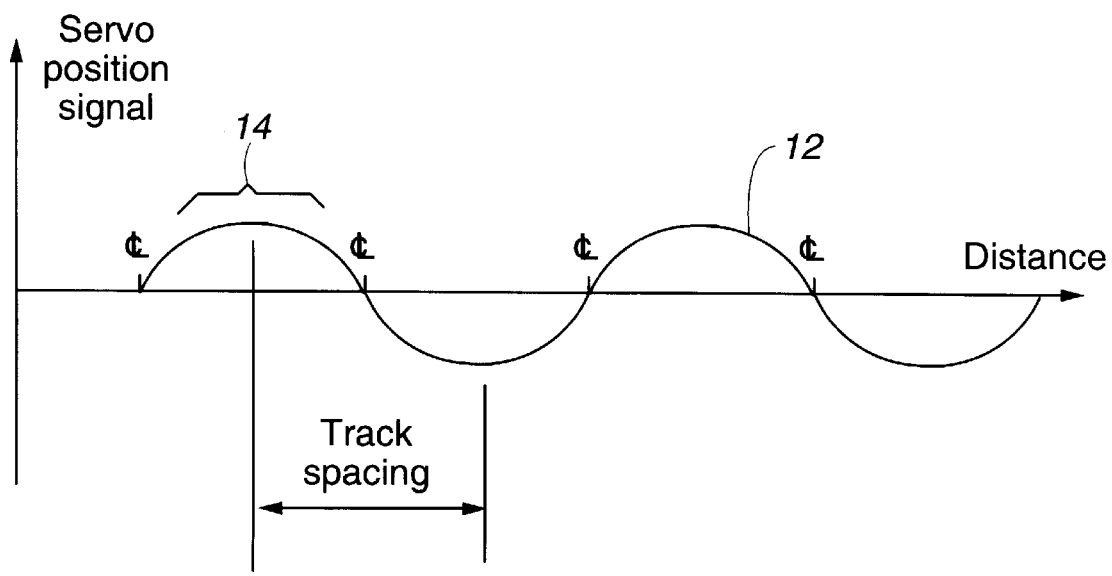
Figure 2:
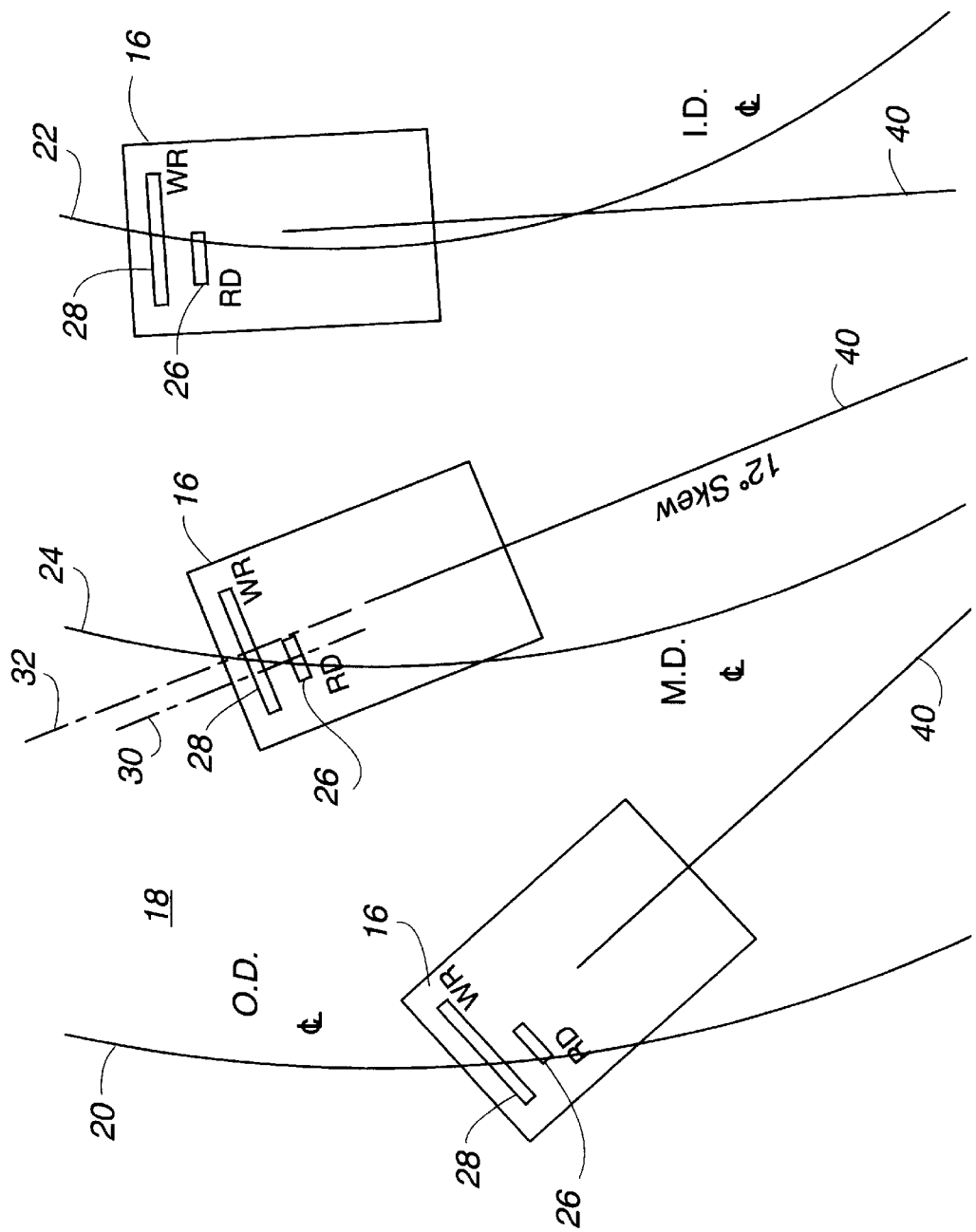
FIG. 2 is a diagram illustrating an offset between a read element and a write element in a dual element head and the effect the offset has when positioning the head over various portions of the disk.

FIG. 2 is a top view illustrating a dual element head 16 in various positions above a disk 18. That is, the figure shows the head 16 above a first track 20 at the outer diameter (O.D.) of the disk 18, above a second track 22 at the inner diameter (I.D.) of the disk 18, and above a third track 24 at a middle diameter (M.D.) of the disk 18. It should be appreciated that three heads are shown in FIG. 2 for comparison purposes only and that, in general, there will be only one head above each disk surface in the drive. It should also be appreciated that the dimensions illustrated in FIG. 2 are exaggerated for illustration purposes.

As shown in FIG. 2, the head 16 is located at the end of an actuator arm 40 that carries the head 16 above the surface of the disk 18. The actuator arm 40 pivots about a pivot point (not shown) so that the angle that the arm makes with each track centerline varies across the surface of the disk. This angle is known as the skew angle. The head 16 includes a read element 26 having a center defined by centerline 30 and a separate write element 28 having a center defined by centerline 32. As illustrated, the read element centerline 30 is purposely offset in a lateral direction from the write element centerline 32. Because of the combined effect of the skew angle and the offset between the elements, the read element 26 and the write element 28 are usually not centered on the same track of the disk 18 at the same time. That is, if one of the two elements is centered on a particular track, the other is generally off-center by a certain amount.

To perform the track following function, a servo system (not shown) is generally implemented that uses feedback information, read from the disk 18 by the read element 26, to properly position the head 16. Because the read element 26 provides the feedback information to the servo system, the system will center the read element 26, rather than the write element 28, if additional information is not supplied to the servo system. During a write operation, therefore, a compensation value must be delivered to the servo system to center the write element 28 above the desired track. The compensation value delivered to the servo system generally varies across the surface of the disk based on the combined effect of the skew angle and the offset between the elements.

It is desirable that the compensation value corresponding to the track 24 at the middle diameter be zero and the compensation values corresponding to the tracks 20, 22 at the outer and inner diameters, respectively, be equal and opposite to reduce stress on the servo system caused by overly large compensation values. This can be achieved by properly choosing and implementing the offset between the elements. However, due to tolerance problems during the manufacture of the head, it is difficult to achieve, on a consistent basis, the element offset required to produce the above scenario. In one aspect of the present invention, a head fabrication method is provided that allows the required element offset to be achieved on a consistent basis.

Even when a servo system is being used by the disk drive to position the head, a certain amount of misalignment can always exist between the centerline of an element of the head and the centerline of the desired track during normal disk drive operation. This misalignment is caused by various factors such as, for example, spindle run out, resonances and disk flutter, thermal track shift, head settling, actuator interactions, improper servo writing, and others. For a particular disk drive, the misalignment between the head element and the track during normal track following operations is specified by a track misregistration (TMR) value. The TMR value represents the maximum range of element misalignment that is probable during normal track following operations of the disk drive. That is, while the disk drive is track following, it is probable that the element centerline will be somewhere within the range specified by the TMR value and improbable that the head will be outside of this range. In general, the TMR is a statistically derived value based on past observations in similar or identical disk drive systems.

A particularly important type of dual element head is a magnetoresistive head that includes a magnetoresistive (MR) read element and a separate write element that is usually inductive. MR read elements include a small piece of magnetoresistive material having a variable resistivity that changes based on an applied magnetic field. That is, as the magnetic field applied to the material increases, the resistivity of the material, in general, decreases. In practice, the MR material is held near the desired track as a substantially constant current is run through the material. The magnetic field variations produced by the magnetic transitions on the rotating track change the resistance of the magnetic material, resulting in a variable voltage across the material that is representative of the data stored on the disk (i.e., a read signal). MR read elements have gained much popularity in recent years as they typically generate read signals having considerably higher voltages than those generated by inductive read elements.

Figure 3A:
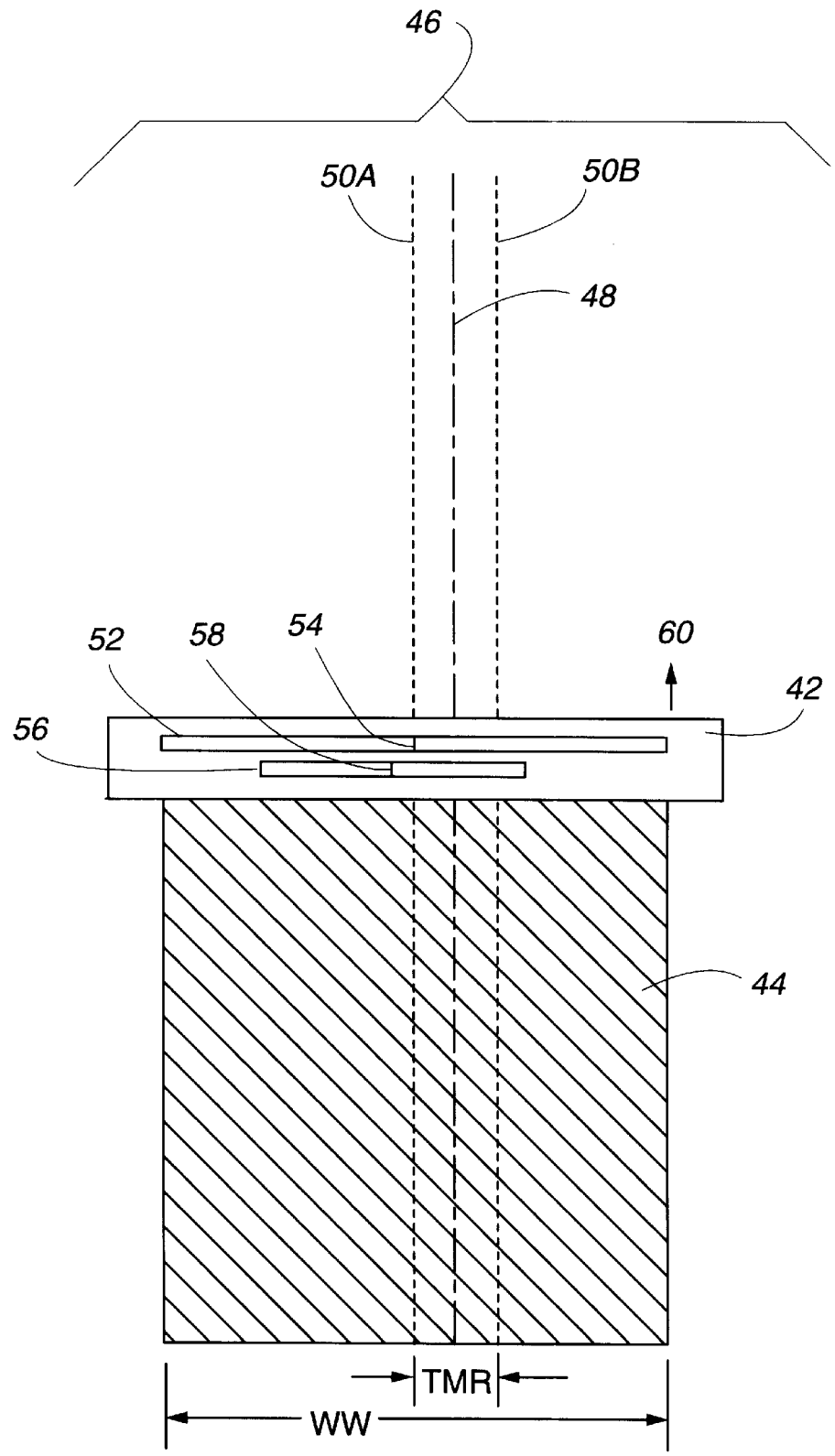
FIGS. 3A–3C illustrate a first write operation to a track, a second, subsequent write operation to the same track, and a subsequent read operation to the same track, respectively, using a prior art dual element head having a write wide/read narrow architecture.
Figure 3B:
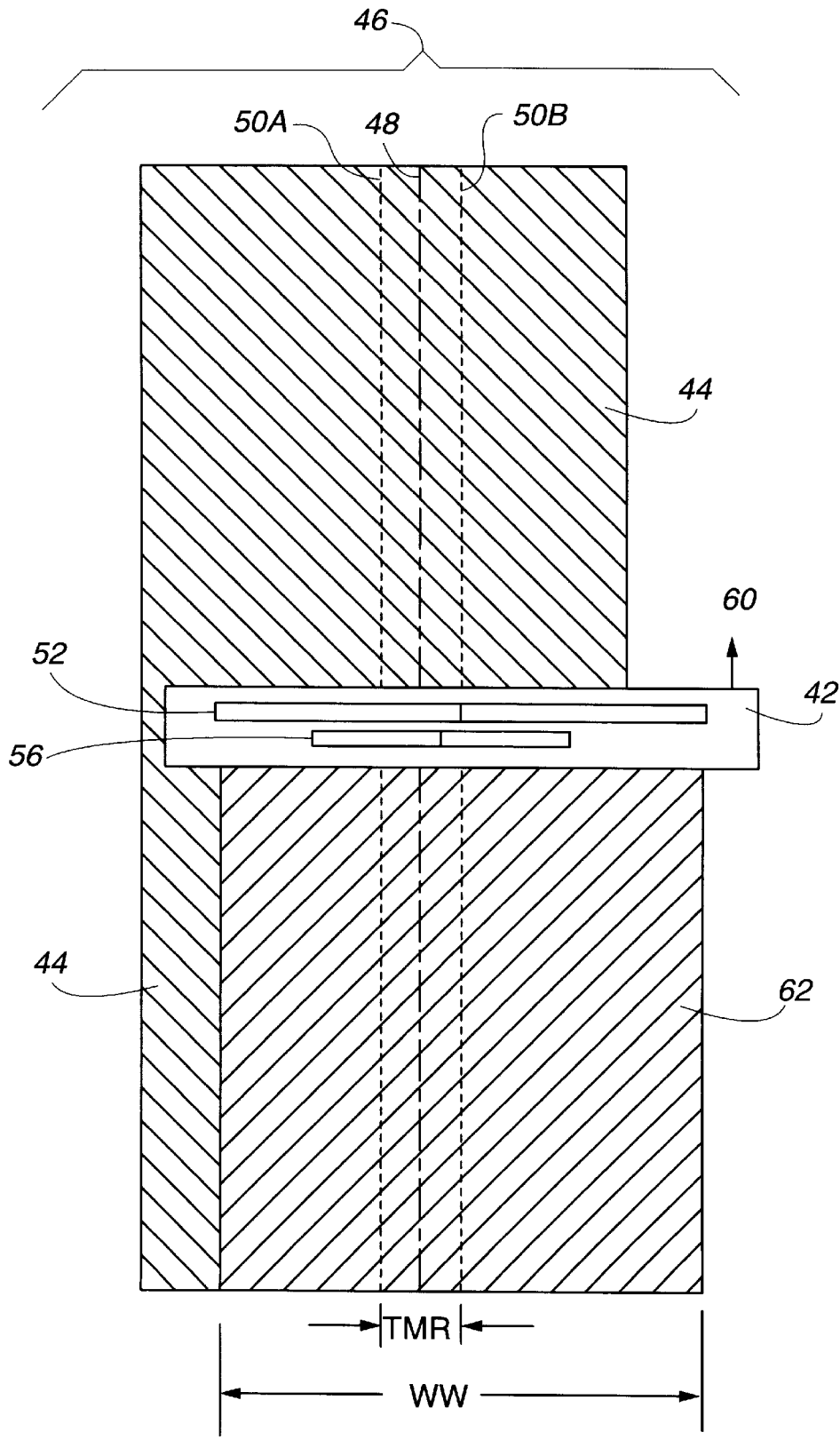
Figure 3C:
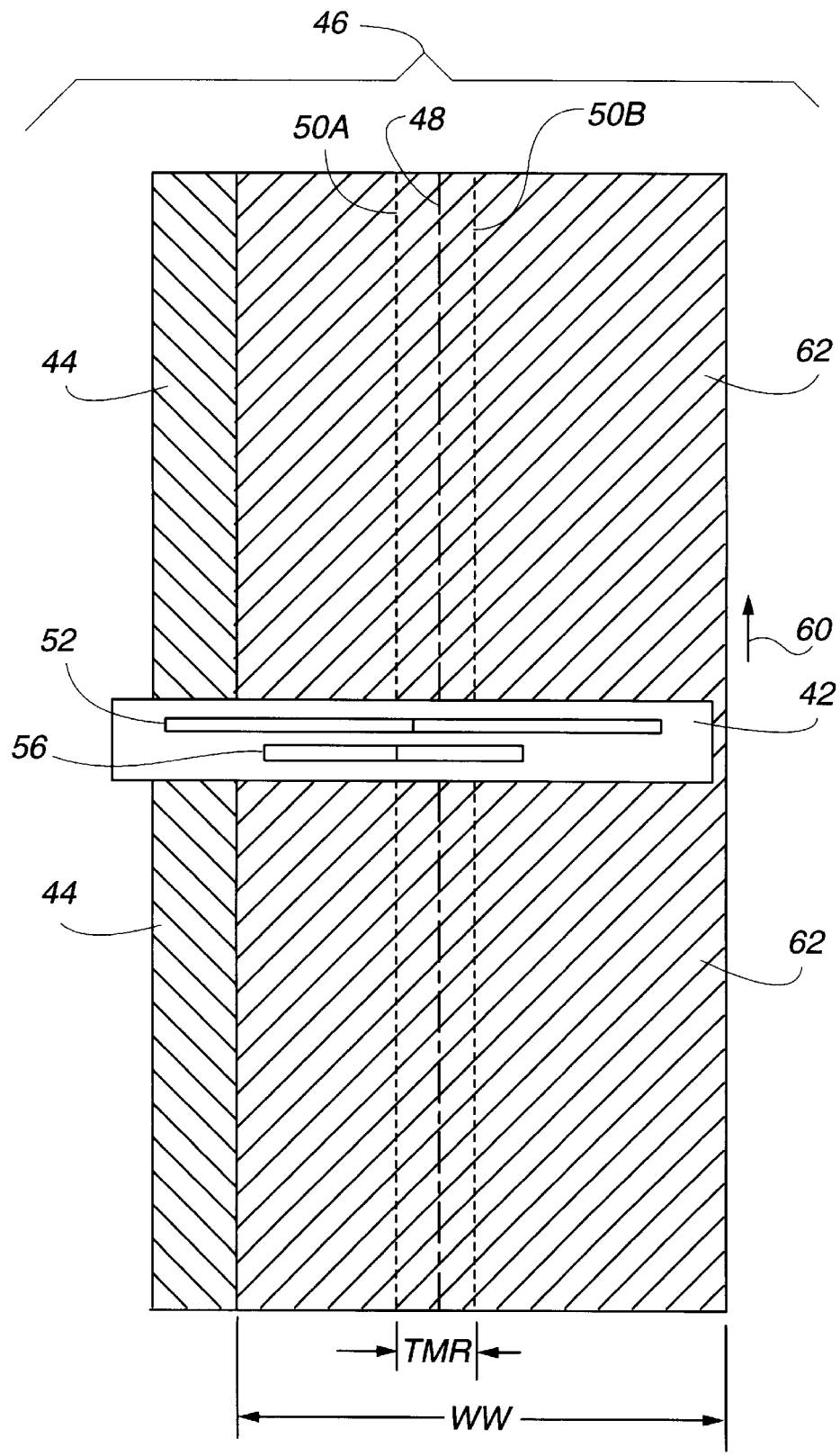

As discussed above, dual element heads of the past utilize a write wide/read narrow approach. It has been determined, however, that this approach results in problems associated with a nonlinear servo position signal transfer function. FIGS. 3A–3C illustrate one reason why the write wide/read narrow approach is believed to be advantageous by the industry. Each of the figures illustrate a dual element head 42 interfacing with a track 46 having a track centerline 48 located beneath the head 42. The head 42 is traveling in a direction 60 with respect to the track 46. The dual element head 42 includes a write element 52 having a write width (WW) defining the width of the data written on the track 46 during a write operation and a read element 56 having a read width (RW) defining the width of the portion of the track 46 that is sensed by the read element 56 during a read operation. The dual element head 42 also includes a write element centerpoint 54 and a read element centerpoint 58 that are substantially laterally offset from one another with respect to the direction of travel 60. Boundary lines 50A and 50B represent the TMR boundaries for the track 46. That is, during normal operation of the disk drive, it is probable that the center of the operative element of the head 42 (i.e., the read element 56 during a read operation and the write element 52 during a write operation) will be located somewhere between the boundary lines 50A and 50B.

FIG. 3A illustrates a first write operation involving track 46, FIG. 3B illustrates a second, subsequent write operation involving track 46, and FIG. 3C illustrates a subsequent read operation involving track 46. During the first write operation, as illustrated in FIG. 3A, the centerline 54 of the write element 52 is aligned with the left TMR boundary line 50A. This situation represents a worst case head positioning scenario and results in first data 44 being written to the track 46 off-center to the left. During the second write operation, as illustrated in FIG. 3B, the centerline 54 of the write element 52 is aligned with the right TMR boundary line 50B. This situation also represents a worst case head positioning scenario and results in second data 62 being written to the track 46 off-center to the right. As illustrated in FIG. 3B, some of the first data 44 from the first write operation remains on the left side of the track 46 after the second write operation is performed. This undesired data, if sensed by the read element 56 during a subsequent read operation, will create coherent noise that can seriously compromise the accuracy of the read signal. However, because the read element 56 is narrower than the write element 52 by a predetermined amount, even if the read element centerline 58 is aligned with the left TMR boundary line 50A during a subsequent read operation, as illustrated in FIG. 3C, the read element 56 will not sense the undesired data.

Figure 4A:
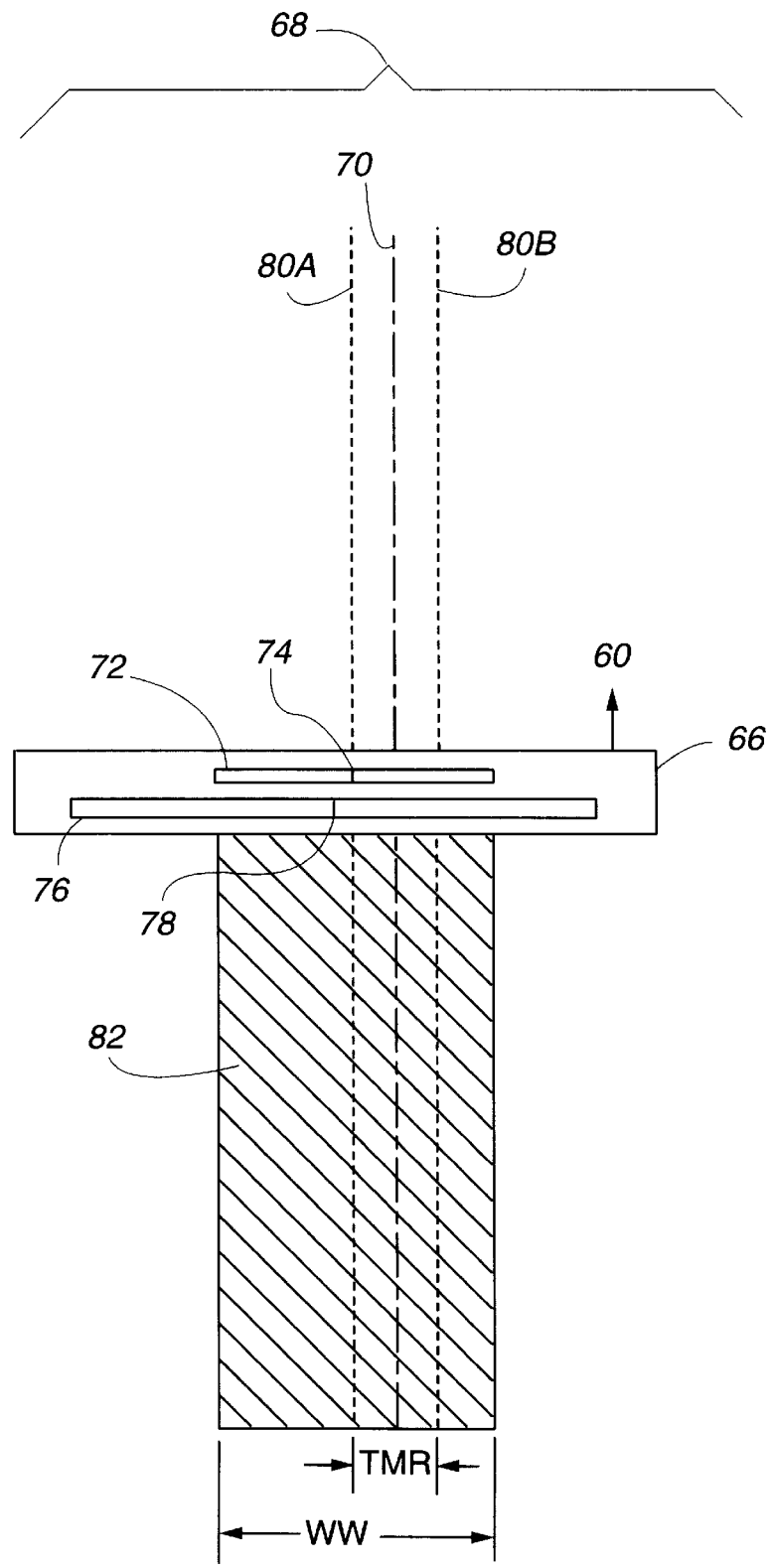
FIGS. 4A–4C illustrate a first write operation to a track, a second, subsequent write operation to the same track, and a subsequent read operation to the same track, respectively, using a dual element head having a read wide/write narrow architecture, that does not create an erase strip about the written data.
Figure 4B:
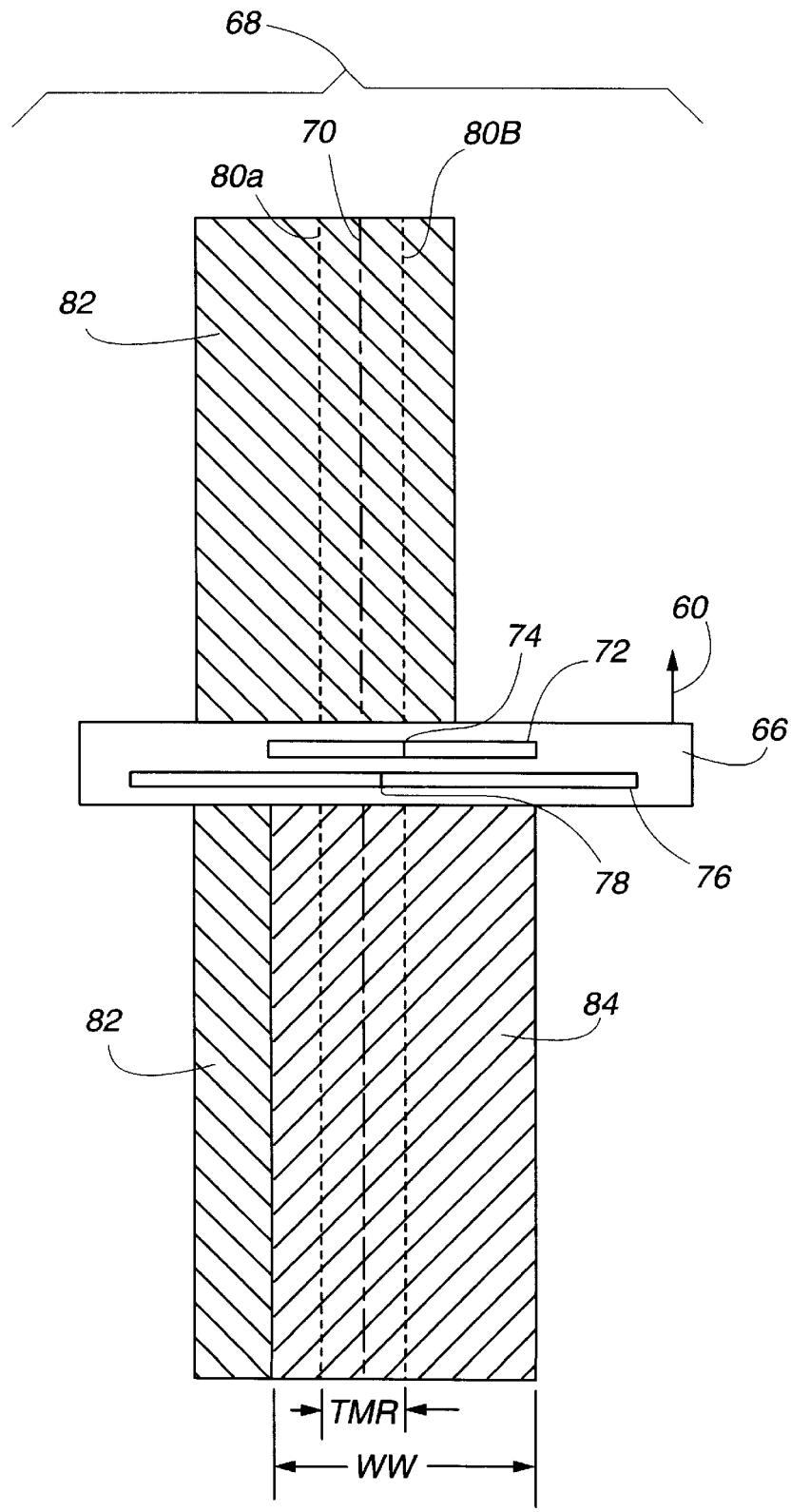
Figure 4C:
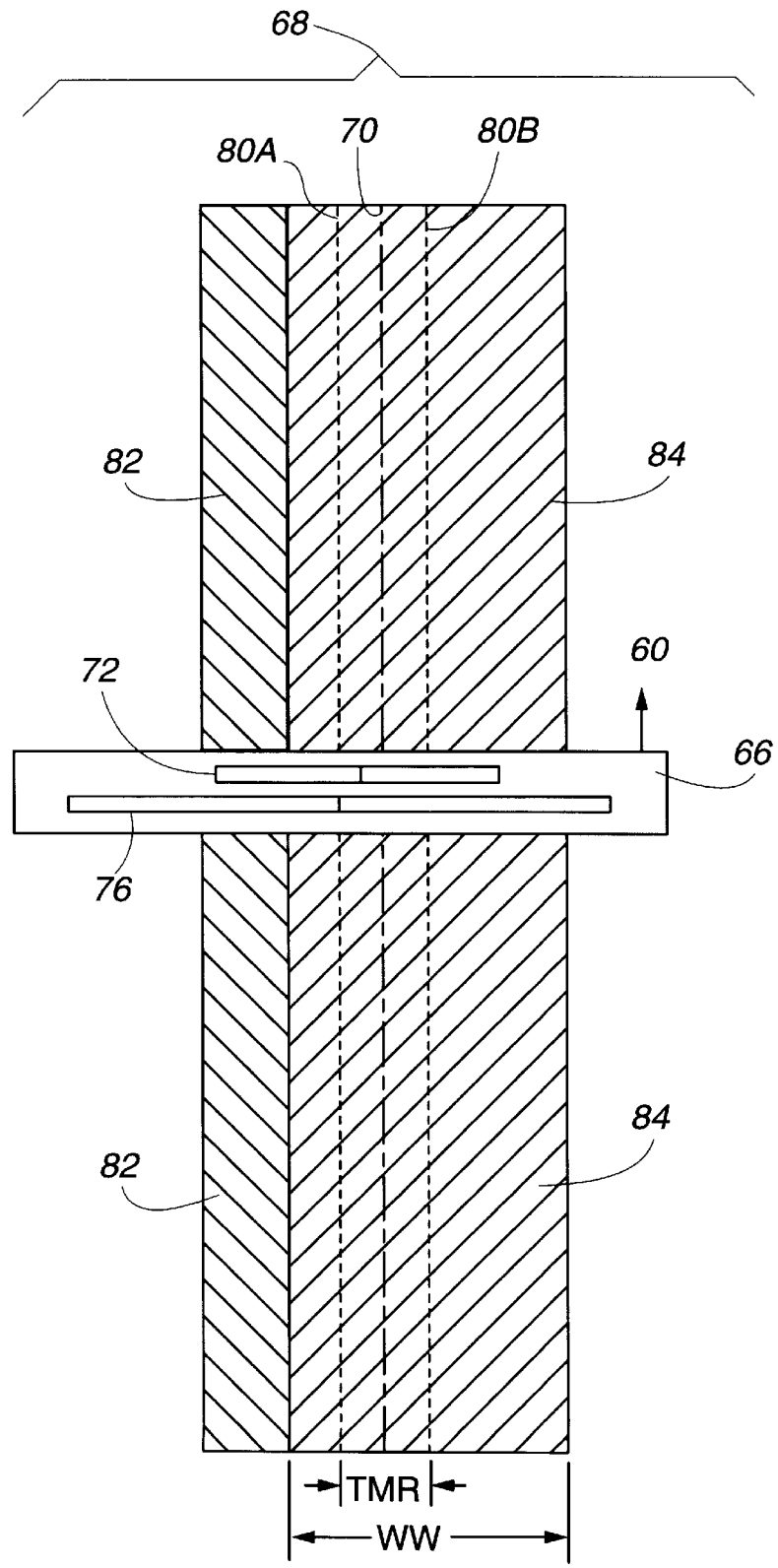

FIGS. 4A–4C are similar to FIGS. 3A–3C but involve the use of a dual element head 66 having a wider read width than write width. These figures illustrate why read wide/write narrow heads have not been used in the past. The dual element head 66 includes a write element 72 having a write width (WW) defining the width of the data written on the track 68 during a write operation and a read element 76 having a read width (RW) defining the width of the portion of the track 68 that is sensed by the read element 76 during a read operation. As before, the dual element head 66 includes a write element centerpoint 74 and a read element centerpoint 78 that are substantially laterally offset from one another with respect to the direction of travel 60 of the head 66. Boundary lines 80A and 80B represent the TMR boundaries for the track 68.

FIG. 4A illustrates a first write operation to the track 68 using head 66. As illustrated, the write element 72 is centered on the left TMR boundary line 80A during the first write operation, therefore writing first data 82 off-center to the left on track 68. FIG. 4B illustrates a second, subsequent write operation to track 68 wherein the write element 74 is centered on the right TNR boundary line 80B. This results in second data 84 being written on the track 68 off-center to the right. As before, some of the first data 82 is left on the track 68 after the second write operation is performed. FIG. 4C illustrates a subsequent read operation wherein the read element 76 is centered on the left TKR boundary line 80A. As shown, during the read operation, the read element 76 will sense both the second data 84, which is the desired read data, and the residual first data 82, which is undesired data (i.e., coherent noise). This sensing of undesired data can severely compromise the resulting read signal and, therefore, the read wide/write narrow approach has never been implemented.

Figure 5A:
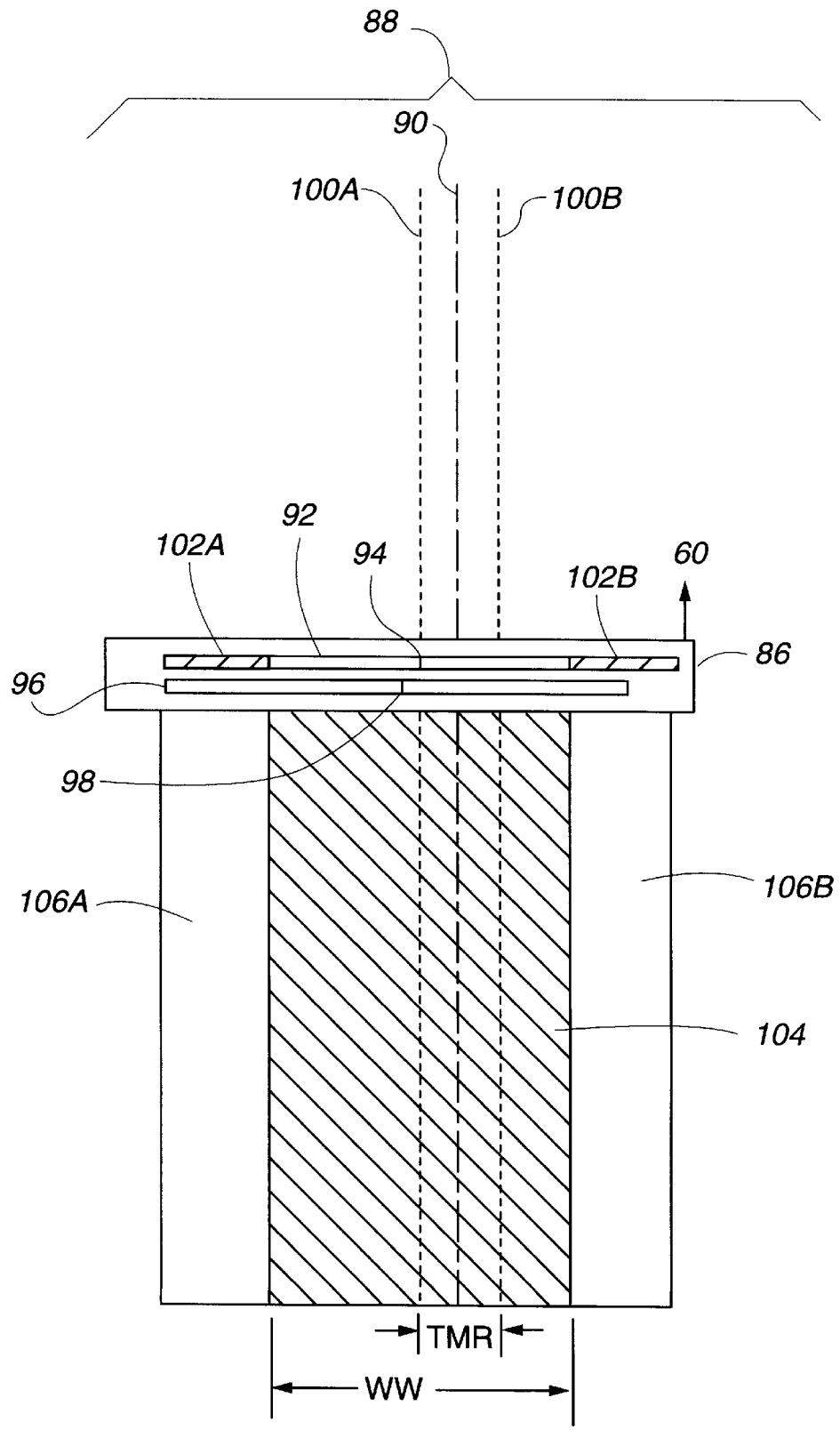
FIGS. 5A–5C illustrate a first write operation to a track, a second, subsequent write operation to the same track, and a subsequent read operation to the same track, respectively, using a dual element head having a read wide/write narrow architecture in accordance with the present invention.
Figure 5B:
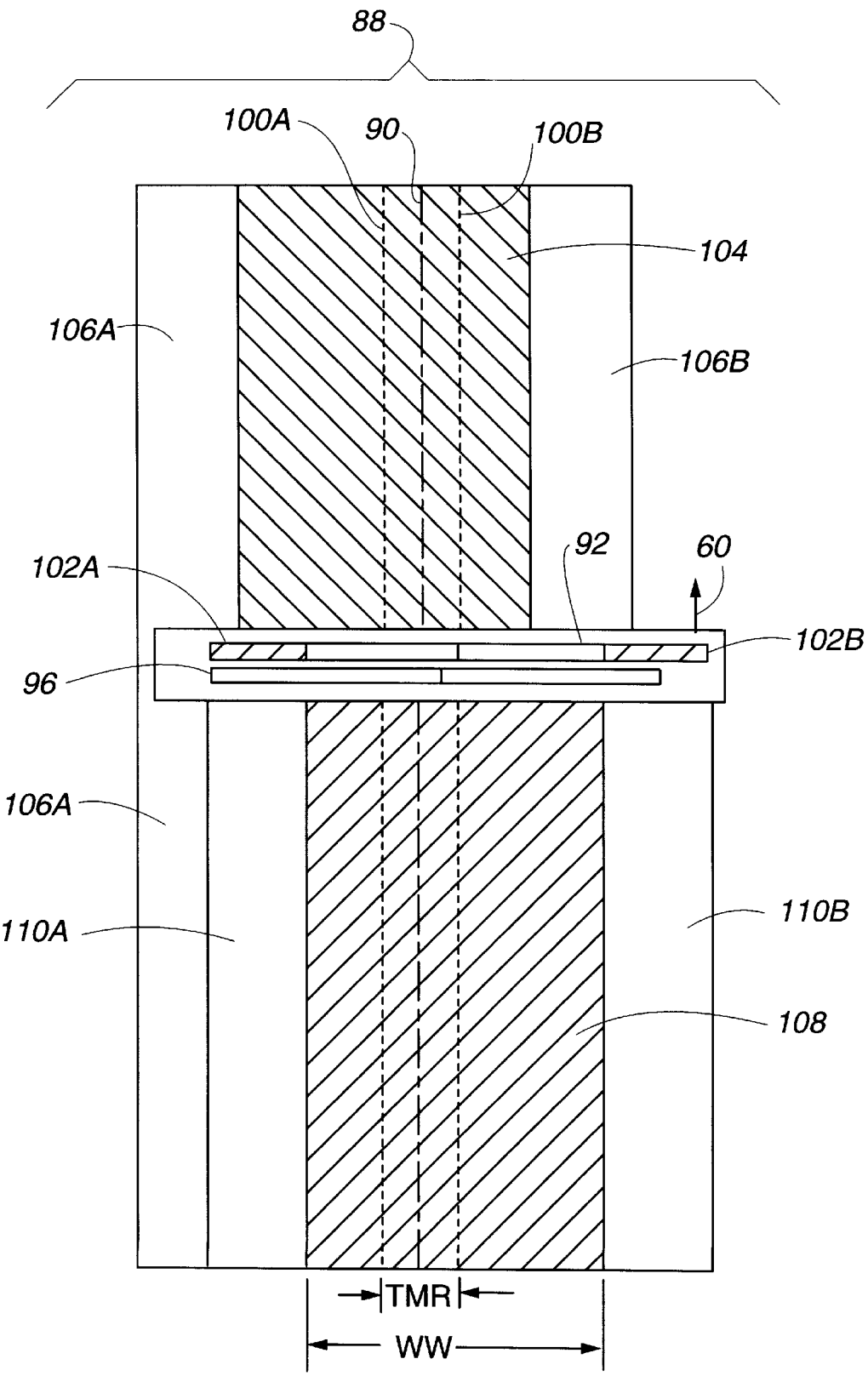
Figure 5C:
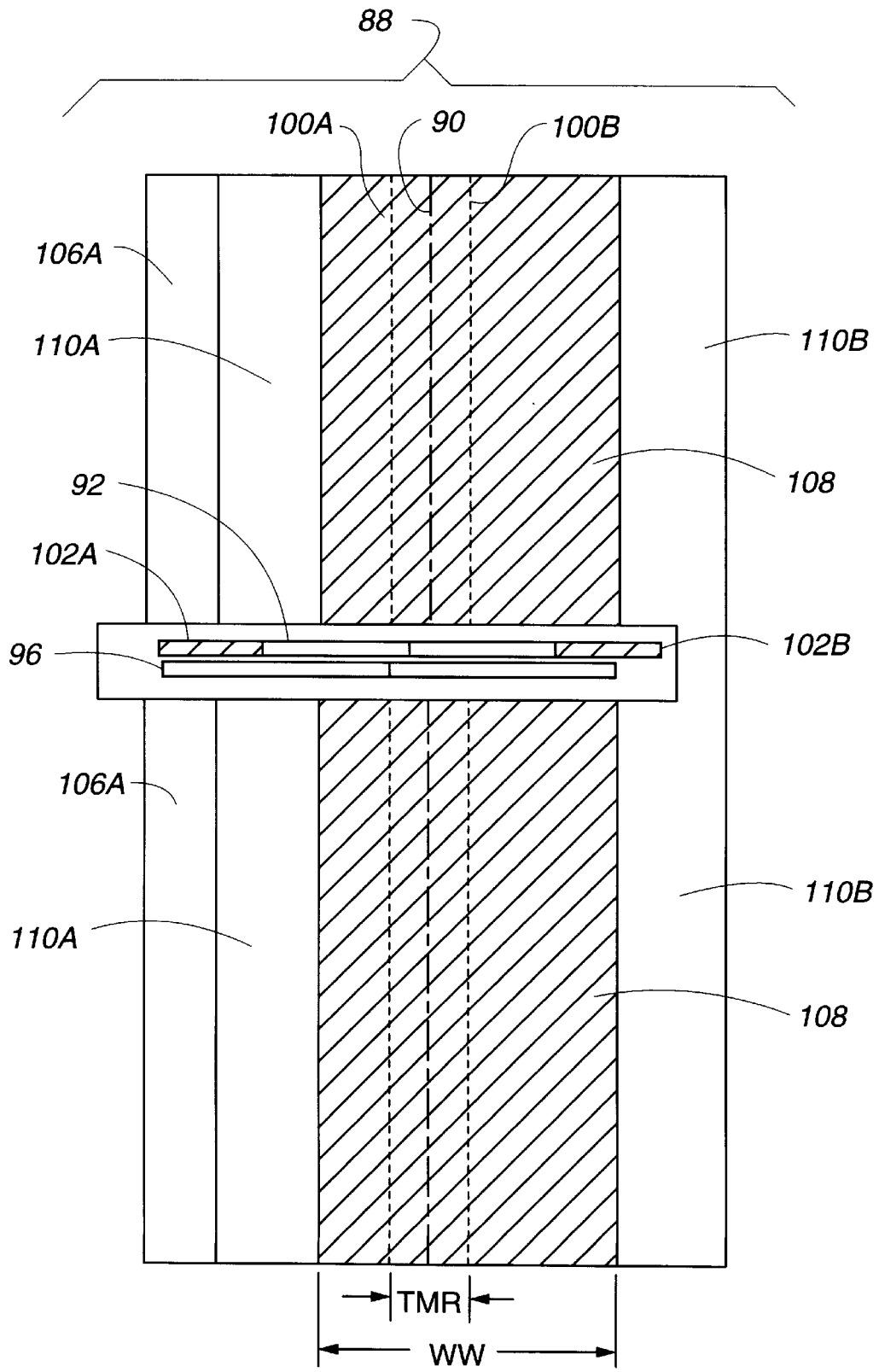

FIGS. 5A–5C illustrate the use of a dual element head 86 in accordance with the present invention. The dual element head 86 includes a write element 92 having a write width (WW) and a read element 96 having a read width (RW), wherein the read width is greater than the write width. The head 86 also includes a read element centerpoint 98 and a write element centerpoint 94 that are substantially laterally offset from one another with respect to direction of travel 60. In addition, the write element 92 includes erase means 102A, 102B for creating erase strips on either side of the data written on the track by the write element 92. Boundary lines 100A, 100B represent the TMR boundaries for the track 88.

FIG. 5A illustrates a first write operation to a track 88 using dual element head 86. During the first write operation, the write element 92 is centered on the left TMR boundary 100A and therefore writes first data 104 off-center to the left on track 88. In addition, the erase means 102A, 102B of write element 92 create first erase strips 106A, 106B on either side of first data 104. The first erase strips 106A, 106B represent areas of the track 88 where no readable data resides.

FIG. 5B illustrates a second, subsequent write operation to track 88. During the second write operation, the write element 92 is centered on the right TMR boundary line 100B and, therefore, writes second data 108 on track 88 off-center to the right. Also, the erase means 102A, 102B of write element 92 create second erase strips 110A, 110B on either side of second data 108 during the second write operation. As illustrated, the second erase strip 110A on the left of the data 108 erases any of the first data 104 that would otherwise have remained on the track 88 after the second write operation. Therefore, during the subsequent read operation of FIG. 5C, the read element 96 will not sense any of the first data 104 on the track 88. To achieve this benefit, however, the width of the erase strips 110A, 110B must be equal to the TMR value (i.e., the distance between the TMR boundaries 100A, 100B) or more. This ensures that data written during a previous write operation will be erased during a subsequent write operation even during worst case head positioning events. To maximize track density, the erase strip width should be made equal to the TMR value (or slightly larger to account for manufacturing tolerances).

In accordance with one embodiment of the present invention, equations are provided for determining values for the read width, write width, and erase strip width of a dual element head following the read wide/write narrow (RW/WN) approach of the present invention. As described above, one of the constraints imposed on the RW/WN head of the present invention is that the width of the erase strip must be greater than or equal to the TMR for the relevant disk drive. This constraint is based upon events associated with a single track. Other constraints exist, however, that are based upon relationships between adjacent tracks. For example, when using a dual element head having a greater read width than write width to perform a read operation on a first track, it is important that the wider read element does not sense data from an adjacent track during the read operation. This situation is most likely to occur as a result of adjacent track squeeze.

Figure 6:
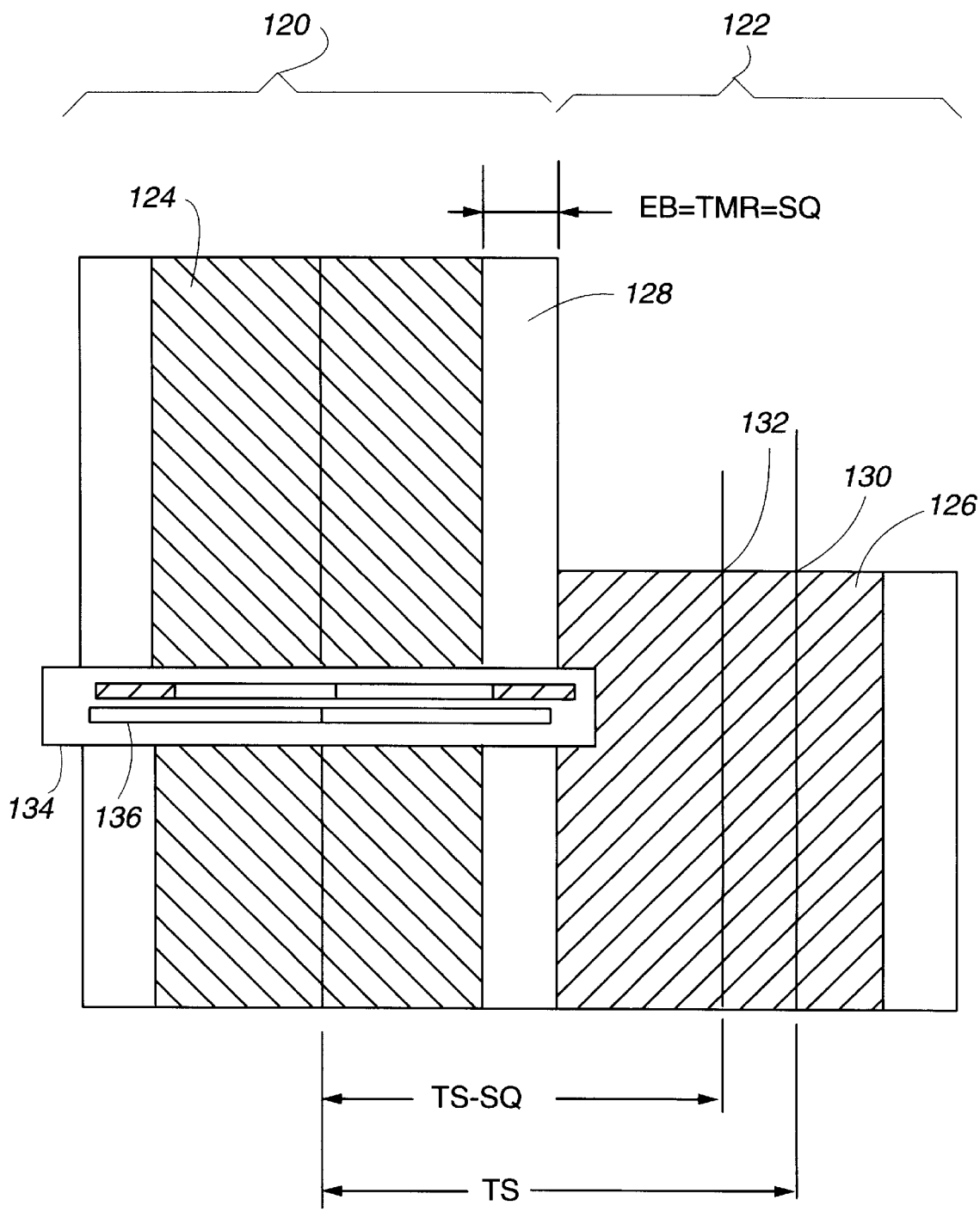
FIG. 6 illustrates an adjacent track squeeze scenario wherein the spacing between two tracks is effectively reduced due to worst case write element positioning during corresponding write operations to the two tracks.

TMR budgets have two basic components, WRTMR and SQTMR. WRTMR basically involves the recovery of data from a single track with the scenario described in FIGS. 3a, 3b, and 3c. It can be seen in FIG. 3c that if the read element 56 is repositioned to the right and is centered over centerline 50B it will be possible to recover the data. Since the data is recoverable with offtrack read retries, we call WRTMR a "non-persistent" error. FIGS. 3a, 3b, and 3c show how the present invention eliminates non-persistent errors. SQTMR basically involves the recovery of data from a single track where the adjacent track has been "squeezed" to encroach on the track of interest (i.e., adjacent track squeeze). FIG. 6 describes this scenario. If the adjacent track is squeezed enough to eliminate the data track of interest, the data of interest may be unrecoverable by any means, and so we call SQTMR a "persistent" error. We will use FIG. 6 and a set of equations to show how the invention eliminates persistent errors.

FIG. 6 illustrates a read operation being performed in a region of a disk where a worst case adjacent track squeeze scenario exists. As shown, a first data track 120 is adjacent to a second data track 122. First data 124 has been written to the first data track 120 and second data 126 has been written to the second data track 122. The area between the first data 124 and the second data 126 is known as the erase band 128 and is defined by an erase band width (EB). Because data will not generally be written in the erase band 128 during normal operation of the disk drive due to the TMR constraint, and because the disk is generally fully dc erased before assembly into the drive, the erase band 128 normally is free of written data.

In FIG. 6, the dual element head 134 is reading the first data 124 from the first track 120 with the read element 136 centered on the first track 120. Note that the data 126 on the adjacent track 122 in FIG. 6 has been mispositioned from the nominal track centerline 130 to a new centerline to the left at 132. In the figure, the data 124 of data track 120 is written first and data 126 of the adjacent track 122 is written second. The offset of track 122 from position 130 to position 132 is the "SQ" or squeeze. SQTMR is described as a "persistent" error because the data of track 122 is permanently written in that position, i.e., no amount of offtrack read retries of the head 134 when it is trying to read the data 124 will have any effect on the position of the data 126. In accordance with the present invention, as illustrated in FIG. 6, the read element 136 does not reach the data 126 on track 122 and, therefore, cannot sense the data 126 even under worst case squeeze positioning conditions. The following equation describes this constraint:

$$TS = [maxRW/2] + [maxWW/2] + SQ$$

where TS is the ideal track spacing, SQ is the SQTMR misregistration value for the disk drive, maXRW is the maximum read width of the read element, and maxWW is the maximum write width of the write element. Using this constraint, the following equations were developed for the nominal dimensions of a dual element head in accordance with one embodiment of the present invention:

$$nomWW = TS - SQ - EB$$

$$nomWW = [2*(TS - SQ) - nomWW*(1 + TW)]/(1 + Tr)$$

where nomWW is the nominal write width, nomRW is the nominal read width, EB is the erase band width, SQ is the allowed amount of adjacent track encroachment from the TMR budget, Tw is the manufacturing tolerance of the write element, and Tr is the manufacturing tolerance of the read element. The manufacturing tolerances are used to reduce the nominal read width value so that data on adjacent tracks will not be read by the read element, even under worst case tolerance conditions.

An example of the application of the above equations follows. For the example, we will assume the following:

Track density is 6,411 tracks per inch, or TS=156 microinches
WR(TMR)=24 microinches
SQ(TMR)=24 microinches
EB=24 microinches
Tw=0.05, or 5%
Tr=0.10, or 10%

It can be seen by inspection of FIGS. 3a, 3b, and 3c that the WRTMR requirement is fulfilled when the EB≧WRTMR, which we have assumed in the above case. By inspection of FIG. 6, we can see that a read mispositioning of read element 136 will cause encroachment into the adjacent data 126, but we are protected by two design points. First, the mispositioning error is non-persistent, i.e., we can do a read retry and it is statistically likely that the read element 136 will be on-track. Second, we have shown the worst-case scenario in FIG. 6 where both the writer and reader are constructed with the maximum allowable tolerances; it is obvious by inspection that any reduction of write or read element width will produce improved off-track read capability.

For the case of SQTMR and persistent errors, we can solve the previous equations for this example (units are in microinches):

$$nomWW = TS - SQ - EB$$
$$nomWW = 156 - 24 - 24$$
$$nomWW = 108$$
$$maxWW = nomWW * (1 + Tw)$$
$$maxWW = 108 * 1.05$$
$$maxWW = 113.4$$
$$nomRW = [2*(TS - SQ) - nomWW*(1 + Tw)]/(1 + Tr)$$
$$nomRW = [2*(156 - 24) - 108*(1 + 0.05)]/(1 + 0.10)$$
$$nomRW = 136.9$$
$$maxRW = nomRW*(1 + Tr)$$
$$maxRW = 136.9 * 1.10$$
$$maxRW = 150.6$$

Checking that the equation for track spacing TS is consistent with the equations for write and read widths:

$$TS = [maxRW/2] + [maxWW/2] + SQ$$
$$156 = [150.6/2] + [113.4/2] + 24$$
$$156 = 156$$

A method for fabricating a dual element head in accordance with the present invention will now be described. The fabrication method being described relates to a dual element head having an MR read element and an inductive write element, but it should be understood that some of the techniques employed can be used to fabricate dual element heads of virtually any type.

Figure 7:
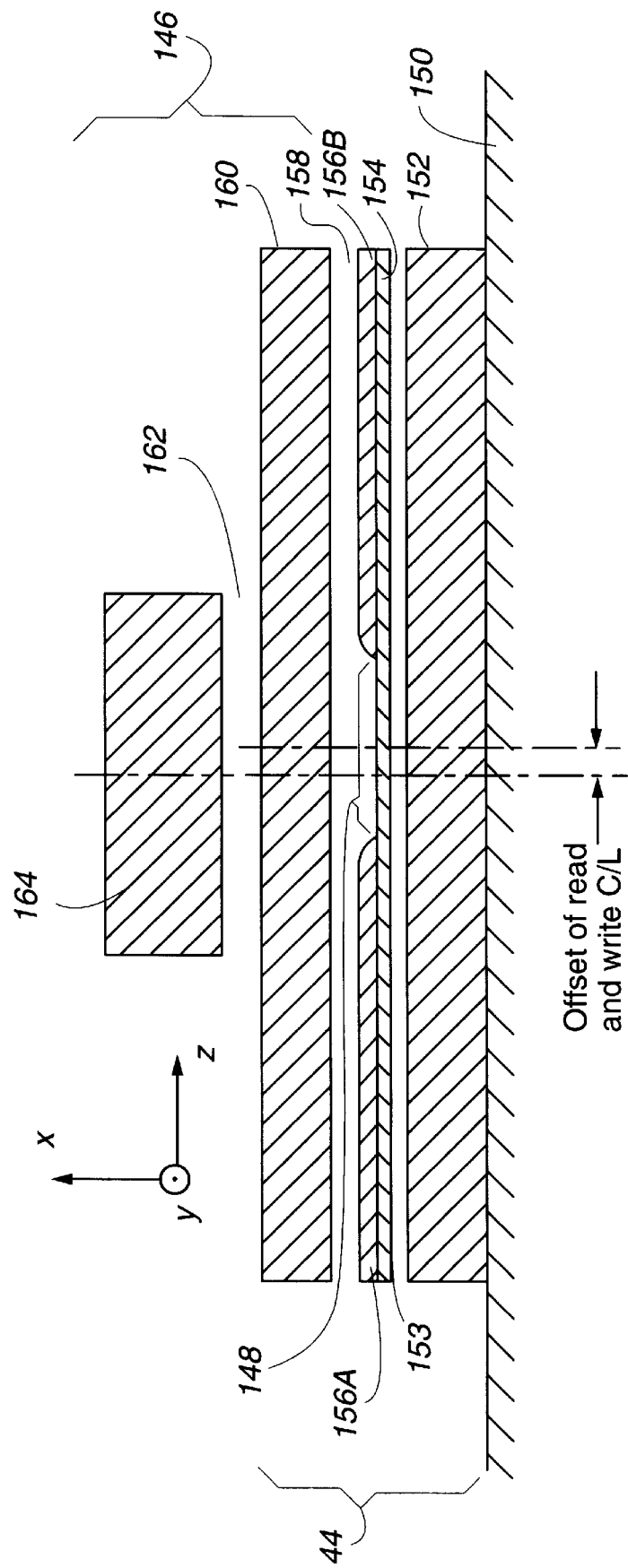
FIG. 7 illustrates a dual element head during an intermediate stage of a head fabrication process in accordance with the present invention.
Figure 8A:
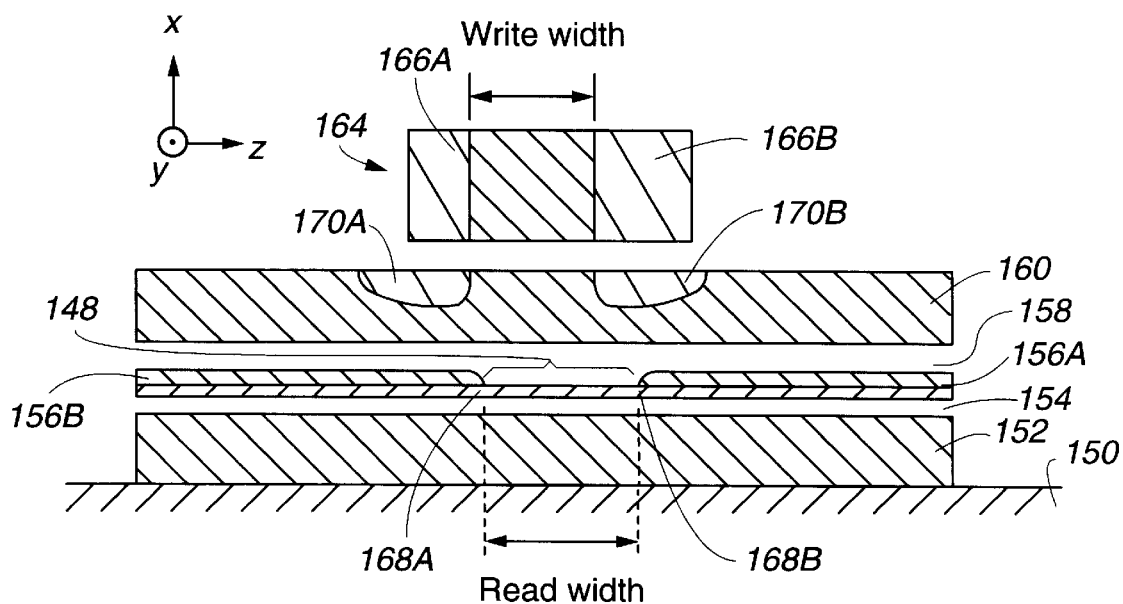
FIGS. 8A and 8B illustrate the dual element head of FIG. 7 during a subsequent stage of the head fabrication process in accordance with the present invention.
Figure 8B:
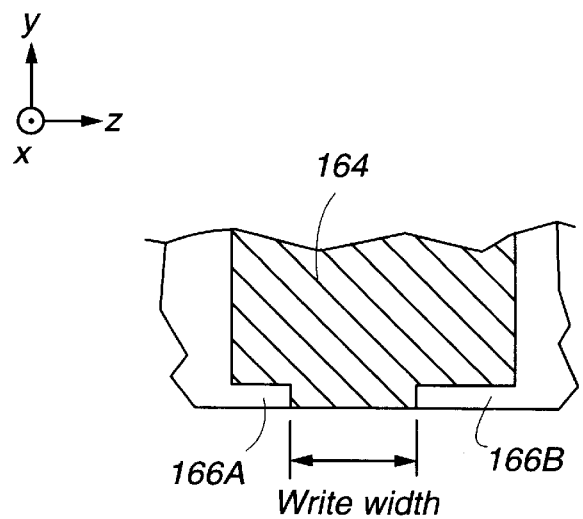

During a first phase of the fabrication process, various layers of the dual element head are deposited on a substrate layer 150. FIG. 7 is a front view of the air bearing surface of a head structure resulting from the first fabrication stage, showing the various layers. As is normally the case in the fabrication of an MR head, the MR read element portion 144 of the head is deposited on the substrate 150 first and then the write element portion 146 is deposited on top. In accordance with the present invention, a second fabrication stage is performed wherein various milling steps are performed on the write element portion 146 of the dual element head, as illustrated in FIGS. 8A, 8B, 9A, and 9B, to finish the fabrication process.

As illustrated in FIG. 7, a lower shield layer 152 of the read element is first deposited on the substrate 150. The lower shield layer 152 is made of an appropriate magnetic material, such as permalloy. Next, a first insulating gap layer 153 is deposited on the lower shield layer 152 and a magnetoresistive (MR) stripe 154, made of a magnetoresistive material, is deposited on the first insulating gap layer 153. MR leads 156A, 156B, made of a conductive material, are then deposited on top of the MR stripe 154 to provide an electrical interface with the MR stripe 154. The portion 148 of the MR stripe 154 left exposed by the MR leads 156A, 156B generally defines the read width of the dual element head. Therefore, the MR leads 156A, 156B must be deposited so that the calculated nominal read width (RWnom) is achieved. Next, a second gap layer 158, made of an insulating material, is deposited on top of the structure and planarized. An upper shield layer 160 is then deposited on top of the second gap layer 158. This structure forms the MR read element portion 144 of the dual element head.

In addition to its primary function as a magnetic shield for the MR stripe 154, the upper shield layer 160 also acts as the lower pole of the write element portion 146. After the upper shield layer 160 has been deposited, a third gap layer 162 of insulating material is deposited on top of the upper shield layer 160 to form the gap of the write element. An upper pole 164 is then deposited on top of the third gap layer 162 to form the second pole of the write element. The width of the upper pole is made wider than the desired write width of the dual element head for reasons that will become apparent shortly.

Up until this point, a relatively standard fabrication process has been described. This process, in general, is subject to various tolerances that can produce errors that effect the resulting structure. For example, tolerances exists for the location (i.e., the center) and size (i.e., the width) of the read width portion 148 of the MR stripe 154. Other tolerances exist for the location and size of the upper pole 164 of the write element. Because the deposition steps are performed independently of one another, the tolerances associated with each of the steps are independent of one another and can therefore produce a cumulative error that is greater than the error resulting from any tolerance individually.

After completion of the first phase of the fabrication process, a second phase is initiated where the write element portion 146 of the dual element head is shaped using a focussed ion beam (FIB) milling process. As illustrated in FIG. 7, a Cartesian coordinate system is used to describe the head, wherein the air bearing surface (ABS) is in the x-z plane and the y coordinate forms a normal to the ABS. In accordance with one embodiment of the present invention, the milling of the write element portion 146 of the head is done from substantially the y-direction. By milling in the y-direction, the milling process can be aligned with the portion 148 of the MR stripe 154 that defines the read width of the dual element head. That is, the FIB can be positioned on the upper pole 164 using, for example, an edge of the portion 148 of the MR stripe 154.

By using the read width portion 148 of the MR stripe 154 as a reference, the individual tolerances of the write element portion 146 can be made substantially dependent on the tolerances of the read element portion 144. This can significantly reduce, or even eliminate, the cumulative tolerance effect described above. In addition, the reduction in overall tolerance errors can be used to increase the overall capacity of the magnetic disk. Theoretically, this capacity increase can be 20 percent or more. Using the read width portion 148 as a reference for the FIB also allows the offset between the read element and the write element to be adjusted so that it is much closer to its designed value than it otherwise would be. This can result in substantially equal and opposite servo off-track compensation values for the inner and outer tracks of the disk, thereby reducing stress on the servo system of the disk drive.

FIGS. 5A and 5B illustrate the dual element head of FIG. 7 after a first milling procedure has been performed. During the first milling procedure, the FIB is used to create erase notches 166A, 166B in the upper pole 164. As described above, the read width portion 148 of the MR stripe 154 is used as a reference to mill the erase notches 166A, 166B. For example, the FIB apparatus can be aligned with the left edge of the read width portion 148 to create the left erase notch 166A and with the right edge 168B to create the right erase notch 166B. During the first milling procedure, at least two things are achieved. First, the offset between the write element and the read element centers is adjusted to be closer to the desired value. And second, the ratio between the write element width and read element width is adjusted to be closer to the desired value. The FIB process is such that the desired values can generally be achieved to a high degree of accuracy. As described above, by properly adjusting the offset between the read element and the write element, equal and opposite servo off-track compensation values can be achieved at the extremes of the data band. It should be appreciated that the technique of milling the write element of a dual element head using a portion of the read element as a reference, and, in particular, using a portion of the read element defining the read width of the read element as a reference, can be applied to virtually any type of dual element head and is not limited to use with MR heads or heads having greater read widths than write widths.

The depth of the erase notches 166A, 166B (i.e., in the y-direction) is chosen to create functional erase bands on the surface of the disk. This generally requires erase notches having a depth of approximately 20 μin. In addition to the erase notches 166A, 166B in the upper pole 164, the first milling procedure can also create optional erase trenches 170A, 170B in the upper shield layer 160 to aid in the definition of the erase strips.

Figure 9A:
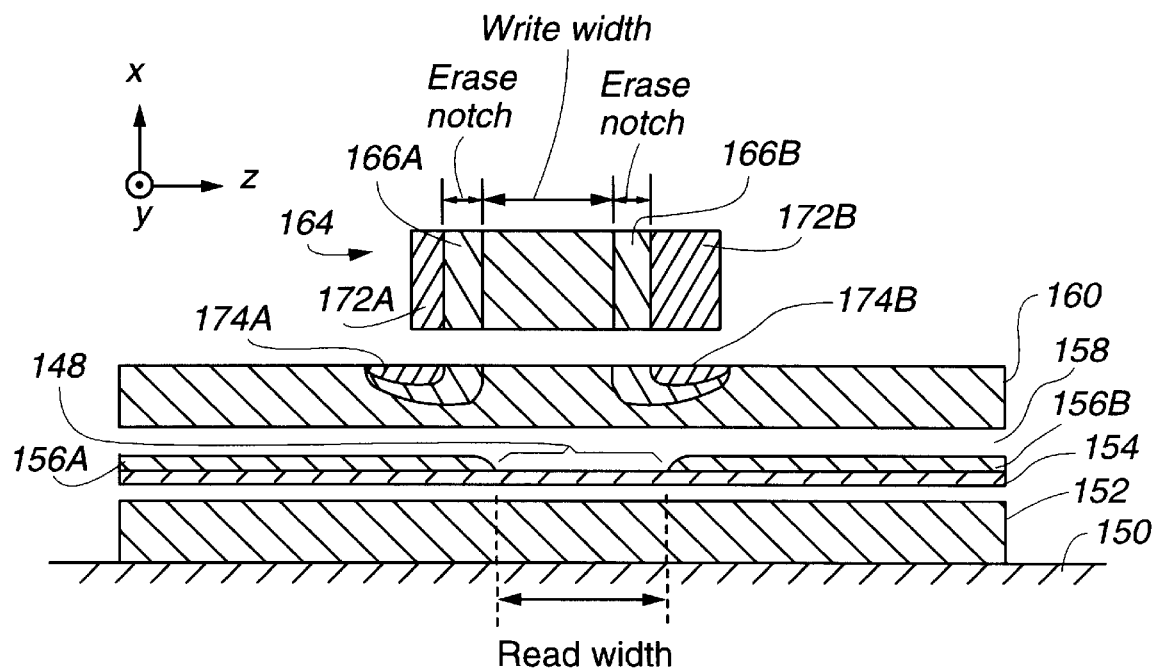
FIGS. 9A and 9B illustrate the dual element head of FIG. 7 after completion of the head fabrication process in accordance with the present invention.
Figure 9B:
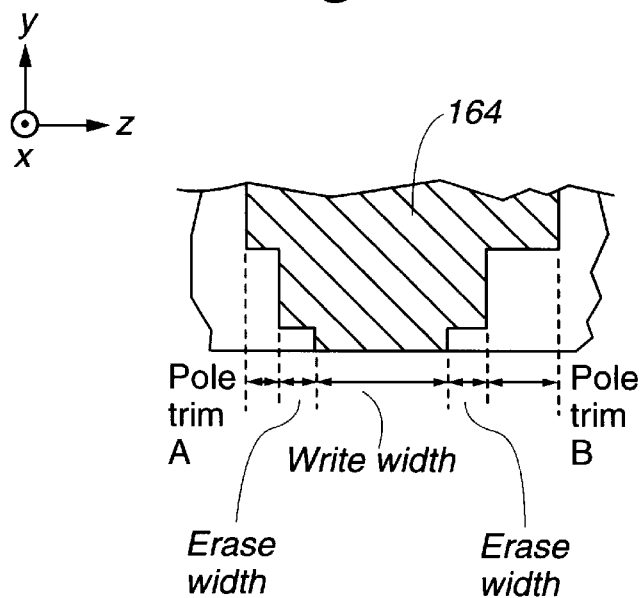

After the first milling procedure has been performed, a second milling procedure can be done. FIGS. 9A and 9B illustrate the dual element head after the performance of the second milling procedure. During the second milling procedure, second notches 172A, 172B are milled into the upper pole 164 to adjust the widths of the erase notches 166A, 166B to their designed values. After the second milling procedure, the erase notch widths are preferably equal to one another. The erase notches 166A, 166B can then be used, for example, to create the erase strips 106A, 106B of FIG. 5A. The FIB can be aligned with the read width portion 148 of the MR stripe 154 during the second milling procedure or with a point on the write element portion 146 of the head. The second milling procedure is preferably performed from the y-direction, or a direction including a y-component, but may be performed from virtually any direction depending upon the reference point chosen.

The depth of the second notches 172A, 172B in the y-direction is chosen so that they perform no write or erase function. When the widths of the erase notches are well controlled and equal on both sides of the head, system signal to noise ratio is maximized. In addition to the second notches 172A, 172B in the upper pole 164, second trenches 174A, 174B can be milled into the upper shield layer 160, during the second milling procedure, to further enhance the definition of the second notches 166A, 166B.

Although the present invention has been described in conjunction with its preferred embodiments, it is to be understood that modifications and variations may be resorted to without departing from the spirit and scope of the invention as those skilled in the art readily understand. For example, the milling of the top pole during the first milling procedure can be performed from a direction other than the pure y-direction as long as the direction includes a y-component in accordance with the present invention. Furthermore, portions of the read element other than the read width portion 148 can be used as a reference during the first or second milling procedures. Also, some of the steps of the fabrication procedure can be rearranged or deleted in accordance with the present invention. Such modifications and variations are considered to be within the purview and scope of the invention and the appended claims.

What is claimed is:

1. A method for fabricating a dual element head for use in transferring data to and from a recording medium, said dual element head having both a read element and a write element, wherein said write element defines a write width and said read element defines a read width, said method comprising the steps of:

first depositing a first head element upon a substrate, said first head element being one of said read element and said write element, and said step of first depositing having a first tolerance;

second depositing a second head element upon said first head element, said second head element being the other of said read element and said write element, and said step of second depositing having a second tolerance, that is independent of said first tolerance, wherein the functional width of said second head element is made wider than a desired functional width for said second head element during said step of second depositing; and trimming said second head element to substantially achieve said desired functional width while using a portion of said first head element as a reference to reduce errors associated with the independent nature of said first and second tolerances.

2. The method, as claimed in claim 1, wherein:

said first head element is said read element and said second head element is said write element.

3. The method, as claimed in claim 2, wherein:

said portion of said first element used as a reference includes a portion defining said read width of said read element.

4. The method, as claimed in claim 2, wherein:

said step of trimming includes creating erase notches on opposite sides of a pole member of said write element, the depths of said erase notches being tailored to erase data from a portion of said recording medium located below said erase notches during a write operation, wherein the inner bounds of said erase notches define the edges of said write width.

5. The method, as claimed in claim 4, wherein:

said step of creating erase notches includes adjusting the widths of said erase notches by creating second notches, next to said erase notches, that are deeper than said erase notches so that said second notches are less capable of erasing data on said recording medium than said erase notches.

6. The method, as claimed in claim 5, wherein said erase notches are of equal width.

7. The method, as claimed in claim 5, wherein:

said read width is greater than said write width.

8. The method, as claimed in claim 2, wherein:

said read element includes a magnetoresistive (MR) read element.

9. The method, as claimed in claim 8, wherein: said step of first depositing includes:

depositing a first shield layer upon said substrate;

depositing at least one MR stripe above said shield layer;

depositing conductive leads upon said at least one MR stripe to provide an electrical interface for said at least one MR stripe; and depositing a second shield layer above said conductive leads, said at least one MR stripe, and said first shield layer.

10. The method, as claimed in claim 8, wherein:

said step of second depositing includes depositing an upper pole member above said second shield layer, wherein said second shield layer acts as a lower pole member for said write element.

11. The method, as claimed in claim 1, wherein said step of trimming includes ion milling.

12. The method, as claimed in claim 1, wherein:

said step of trimming includes aligning a focused ion beam (FIB) with said portion of said first head element and using the FIB to remove material from a portion of said second head element.

13. The method, as claimed in claim 1, wherein:

said step of trimming has a third tolerance which is less than said second tolerance.

14. The method, as claimed in claim 2, wherein:

said recording medium includes a disk having a plurality of concentric tracks, wherein said head is positioned above a track of said disk while said track moves in a substantially longitudinal direction below said head, during a transfer of data with said track; and said step of trimming includes providing a desired lateral offset, with respect to a track of said disk, between the center of said read element and the center of said write element so that substantially equal micro jogging is required at an inner diameter and an outer diameter of said disk when positioning said head.

15. A method for fabricating a dual element head for use in transferring data to and from a track of a disk, said dual element head having both a read element and a write element, wherein said write element defines a write width having a write width center and said read element defines a read width having a read width center, said method comprising the steps of:

providing a substrate having an upper surface residing substantially in a y-z plane of a Cartesian coordinate system;

first depositing a first plurality of layers upon said substrate to form a first head element upon said substrate, said first head element being one of said read element and said write element, and said first layers being deposited upon said substrate from approximately the x-direction of said Cartesian coordinate system;

second depositing a second plurality of layers upon said first plurality of layers to form a second head element, said second layers also being deposited from approximately said x-direction of said Cartesian coordinate system, said second head element being the other of said read element and said write element, wherein said first head element and said second head element include an air bearing surface residing substantially in the x-z plane of said Cartesian coordinate system; and trimming said second head element by directing a focussed ion beam (FIB) at a portion of said second head element from a direction that includes a y-component to adjust a width of said second head element in substantially the z-direction.

16. The method, as claimed in claim 15, wherein:

said step of trimming includes directing said FIB from substantially said y-direction.

17. The method, as claimed in claim 15, wherein:

said first head element is said read element and said second head element is said write element; and said step of trimming includes adjusting the width of said write element so that said write width center is offset from said read width center, in substantially the z-direction, by substantially a predetermined amount.

18. The method, as claimed in claim 15, wherein:

said step of trimming includes using a portion of said first head element as a reference for directing said FIB.

19. The method, as claimed in claim 15, wherein:

said first head element is a magnetoresistive (MR) read element and said second head element is an inductive write element.

20. A method for fabricating a dual element head for use in transferring data to and from a recording medium, said dual element head having both a read element and a write element, said method comprising the steps of:

forming a first head element, being one of said read element and said write element, upon a substrate, wherein forming said first head element includes a first deposition step having a first tolerance; and forming a second head element, being the other of said read element and said write element, over said first head element, wherein forming said second head element includes a second deposition step having a second tolerance that is independent of said first tolerance, and further includes a first trimming step using said first head element as a reference to reduce errors associated with the independent nature of said first and second tolerances.

21. The method, as claimed in claim 20, wherein:

said first head element is said read element and said second head element is said write element.

22. The method, as claimed in claim 21, wherein:

said write element includes first and second poles, and said first pole includes (i) a central write portion that defines a write width of written data on said recording medium, and (ii) first and second erase notches adjacent to said central write portion that define erase widths of first and second erase strips, respectively, adjacent to opposite sides of said written data on said recording medium.

23. The method, as claimed in claim 22, wherein:

said write element further includes first and second secondary notches adjacent to said first and second erase notches.

24. The method, as claimed in claim 23, wherein:

said erase notches have a first depth with respect to said central write portion; and said secondary notches have a second depth greater than said first depth with respect to said central write portion.

25. The method, as claimed in claim 24, wherein:

said first and second erase notches have substantially equal widths; and said first and second secondary notches have different widths.

26. The method, as claimed in claim 24, wherein:

said second pole includes first and second erase trenches that aid said first and second erase notches, respectively, in the definition of said first and second erase strips, respectively.

27. The method, as claimed in claim 26, wherein:

said second pole includes first and second secondary trenches adjacent to and deeper than said first and second erase trenches, respectively.

28. The method, as claimed in claim 24, wherein:

said read element is a magnetoresistive (MR) read element.

29. The method, as claimed in claim 28, wherein:

said read element defines a read width on said recording medium; and said read width is greater than said write width.

30. The method, as claimed in claim 29, wherein:

a combined width of said erase widths and said write width is greater than said read width.

31. The method, as claimed in claim 19, wherein:

said first and second head elements include an air bearing surface that resides substantially in an x-z plane of a Cartesian coordinate system; and said first trimming step includes directing a focussed ion beam (FIB) at said second head element from a direction that includes a y-component of said Cartesian Coordinate system.

32. The method, as claimed in claim 31, wherein:

said direction is substantially a y-direction of said Cartesian coordinate system.

33. The method, as claimed in claim 24, wherein:

said first trimming step forms said first and second erase notches with first and second temporary widths, respectively; and then a second trimming step forms said first and second secondary notches and reduces the widths of said first and second erase notches from said first and second temporary widths, respectively, to first and second permanent widths, respectively.

34. The method, as claimed in claim 33, wherein:

said first and second temporary widths are different; and said first and second permanent widths are equal.

35. The method, as claimed in claim 33, wherein:

said read and write elements include an air bearing surface that resides substantially in an x-z plane of a Cartesian coordinate system;

said first trimming step includes directing a focussed ion beam (FIB) at said write element from a direction that includes a y-component of said Cartesian coordinate system; and said second trimming step includes directing a focussed ion beam (FIB) at said write element from a direction that includes a y-component of said Cartesian coordinate system.

36. The method, as claimed in claim 35, wherein:

during said first and second trimming steps, said direction is substantially a y-direction of said Cartesian coordinate system.

37. The method, as claimed in claim 35, wherein:

said second trimming step uses said read element as a reference.

38. The method, as claimed in claim 35, wherein:

said second trimming step uses said write element as a reference.

39. The method, as claimed in claim 35, wherein:

said read element defines a read width on said recording medium;

said read width is greater than said write width; and a combined width of said erase widths and said write width is greater than said read width.

40. A method for fabricating a dual element head for transferring data to and from a recording medium, comprising:

fabricating a read element for reading data from said recording medium during a read operation and having a read width that defines a portion of said recording medium that is sensed during said read operation; and fabricating a write element for simultaneously writing data to said recording medium and erasing undesired data from said recording medium during a write operation, wherein said write element includes (i) a central write portion that defines a write width of the written data, (ii) first and second erase notches adjacent to said central write portion that define erase widths of first and second erase strips, respectively, adjacent to opposite sides of said written data, and (iii) first and second secondary notches adjacent to said first and second erase notches, respectively, and further including:

applying a first trimming step to said write element to form said first and second erase notches with temporary widths, and then applying a second trimming step to said write element to form said first and second secondary notches and to reduce the widths of said first and second erase notches from said temporary widths to permanent widths that define said erase widths.

41. The method, as claimed in claim 40, wherein:

said erase notches have a first depth with respect to said central write portion; and said secondary notches have a second depth greater than said first depth with respect to said central write portion.

42. The method, as claimed in claim 41, wherein:

said first and second erase notches have equal permanent widths in a direction of said erase widths; and said first and second secondary notches have different widths in the direction of said erase widths.

43. The method, as claimed in claim 40, wherein:

said write element includes first and second poles; and said first pole includes said central write portion, said first and second erase notches, and said first and second secondary notches.

44. The method, as claimed in claim 43, wherein:

said second pole includes first and second erase trenches that aid said first and second erase notches, respectively, in the definition of said first and second erase strips, respectively.

45. The method, as claimed in claim 44, wherein:

said second pole includes first and second secondary trenches adjacent to and deeper than said first and second erase trenches, respectively.

46. The method, as claimed in claim 40, wherein:

said read element is a magnetoresistive (MR) read element and said write element is an inductive write element.

47. The method, as claimed in claim 46, wherein:

said read width is greater than said write width.

48. The method, as claimed in claim 47, wherein:

a combined width of said erase widths and said write width is greater than said read width.

49. The method, as claimed in claim 40, wherein:

said recording medium is a disk.

50. The method, as claimed in claim 40, wherein:

said recording medium is a tape.

* * * * *